(12) United States Patent
Smith

(10) Patent No.: US 6,817,580 B2
(45) Date of Patent: Nov. 16, 2004

(54) SYSTEM AND METHOD FOR RETURN AND LANDING OF LAUNCH VEHICLE BOOSTER STAGE

(76) Inventor: Norman Louis Smith, 2445 La Rochelle Ct., Seabrook, TX (US) 77586

( * ) Notice: Subject to any disclaimer, the term of this patent is extended or adjusted under 35 U.S.C. 154(b) by 1 day.

(21) Appl. No.: 10/390,048

(22) Filed: Mar. 17, 2003

(65) Prior Publication Data

US 2003/0192984 A1 Oct. 16, 2003

Related U.S. Application Data

(60) Provisional application No. 60/365,400, filed on Mar. 18, 2002.

(51) Int. Cl.$^7$ ................................................ B64G 1/40
(52) U.S. Cl. ................................. 244/172; 244/158 R
(58) Field of Search ........................ 244/172, 2, 158 R

(56) References Cited

U.S. PATENT DOCUMENTS

| | | | | |
|---|---|---|---|---|
| 4,265,416 A | * | 5/1981 | Jackson et al. ................. 244/2 |
| 5,564,648 A | * | 10/1996 | Palmer ........................... 244/2 |
| 5,568,901 A | * | 10/1996 | Stiennon ....................... 244/63 |
| 5,842,665 A | * | 12/1998 | McKinney et al. ............. 244/2 |
| 5,927,653 A | * | 7/1999 | Mueller et al. ............. 244/172 |
| 6,158,693 A | * | 12/2000 | Mueller et al. ......... 244/158 R |
| 6,193,187 B1 | * | 2/2001 | Scott et al. .................... 244/2 |
| 6,227,486 B1 | * | 5/2001 | Balepin .................... 244/73 R |
| 6,450,452 B1 | * | 9/2002 | Spencer et al. ......... 244/158 R |
| 6,454,216 B1 | * | 9/2002 | Kiselev et al. ............. 244/160 |
| 6,612,522 B1 | * | 9/2003 | Aldrin et al. .................. 244/2 |
| 6,622,971 B1 | * | 9/2003 | Robertson ................... 244/172 |
| 2003/0052232 A1 | * | 3/2003 | Hall ........................... 244/172 |
| 2003/0230676 A1 | * | 12/2003 | Hall ........................... 244/172 |

* cited by examiner

*Primary Examiner*—Michael J. Carone
*Assistant Examiner*—James S. Bergin

(57) ABSTRACT

A recoverable/reusable booster stage has air-breathing jet engines mounted on the inter-tank ring in alignment with the center axis of the booster body. The jet engines provide supplemental lift on ascent, power the booster on a return flight, and hover the spent booster for a vertical, tail-down landing at the launch site.

3 Claims, 1 Drawing Sheet

SYSTEM AND METHOD FOR RETURN AND LANDING OF LAUNCH VEHICLE BOOSTER STAGE

CROSS-REFERENCE TO RELATED APPLICATIONS

Provisional Patent Application, application No. 60/365,400, filed Mar. 18, 2002, titled "System and Method for Return and Landing of a Launch Vehicle Booster Stage".

STATEMENT REGARDING FEDERALLY SPONSORED RESEARCH OR DEVELOPMENT

Not Applicable. This invention was conceived and developed with private funds.

REFERENCE TO SEQUENCE LISTING, A TABLE, OR A COMPUTER PROGRAM LISTING COMPACT DISK APPENDIX

Not Applicable.

BACKGROUND OF THE INVENTION

The present invention relates to launch vehicles and, in particular, to recoverable booster stages that are used to assist orbital vehicles or payloads in attaining orbit or heading to outer space and to a method of recovering the booster stage for reuse.

Expendable launch vehicles of multiple stages are widely used to propel space vehicles or payloads into space. Recovery of the first stage, or booster stage, is impossible or impractical with the existing systems and method of operation. The only reusable launch vehicle is the Space Shuttle, which is too costly to be competitive for commercial launches. Commercial launches are competitively sold based on launch price, payload lift capability, demonstrated reliability, launch availability, and finance terms. A reusable launch vehicle is commercially viable only if it offers significant benefits over an expendable launch vehicle in one or more of these areas. While there are many concepts for reusable launch vehicles in the prior art, none have been commercially viable.

REFERENCES

Steven J. Isakowitz, "International Reference Guide to Space Launch Systems", American Institute of Aeronautics and Astronautics, 1991, 295 pages.

Jefferson Morris, "New Expendable Rocket Needed to Supplement EELV, Teets Says", Aerospace Daily, Feb. 21, 2003, 1 page.

BRIEF SUMMARY OF THE INVENTION

An object of the present invention is to significantly reduce the cost of launching payloads into space, increase reliability, and increase availability while providing a payload lift capability near that of existing expendable launch vehicles. Another object is to enable a booster stage to land in a reusable condition at any desired site, particularly at or near the launch site, thereby eliminating the need, time and costs to transport the booster back to the launch site and permitting a rapid turnaround time between flights.

The foregoing objects are attained, in accordance with the present invention, by a recoverable/reusable booster stage having a liquid-fueled air breathing engine or engines side-mounted symmetrically around the central portion of a booster of conventional configuration in alignment with the center axis of the body and of sufficient thrust to hover the spent weight of the booster on jet thrust alone in a vertical tail-down orientation. In a particular embodiment, two jet engines are mounted symmetrically on opposite sides of the inter-tank spacer of a conventional expendable booster stage in general alignment with the central axis of the booster. After launch and separation from the 2nd stage/payload the booster returns to the launch site under jet power and lands vertically, tail down, hovering over the landing pad on jet thrust. Landing gear and low speed wings are not required, which greatly enhances the payload lift capability for the booster. In another embodiment, the jet engines also run on ascent augmenting the booster's rocket thrust. The net positive thrust from the jet engines prevents the loss in performance from the added weight to the booster and allows the booster to carry more rocket propellant, i.e. to impart a greater delta-velocity to the 2nd stage/payload. This produces a payload lift capacity near that of an expendable launch vehicle. Together and in part, these embodiments lower the costs to launch payloads into space since the booster is recovered and reused after each launch.

The present invention provides the following advantages. (1) A payload lift capability near that of a comparable expendable launch vehicle. (2) Greater safety than horizontal landing concepts, which involve much higher landing speeds than this invention and have a greater potential for causing damage during a crash. (3) Low cost development since the preferred embodiment can be constructed from currently available boosters and technology, which avoids the cost of developing a new design. (4) Lower operating costs by consolidating launch operations around a single booster, i.e. launching large and small payloads with a common booster. Smaller payloads are launched by off-loading booster propellant and throttling the main engines. This limits the acceleration load on the payload. (5) Greater availability and flight rate flexibility since this invention is recovered and refurbished for flight at the launch site. (6) Greater reliability than expendable launch vehicles since this invention facilitates post-flight inspections. Design margins and reliability in later practice of this invention are improved as the flight environment data is correlated with the observed fatigue.

DETAILED DESCRIPTION OF THE INVENTION

Figure 1:
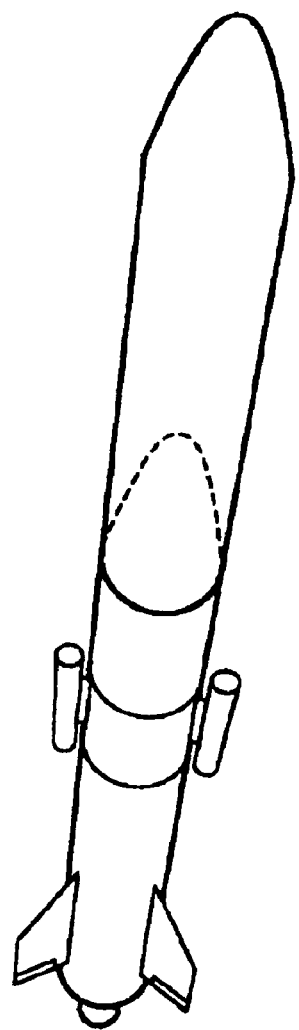
FIG. 1 is a schematic perspective side view of a launch vehicle assembly constructed in accordance with a preferred embodiment of the present invention.

The preferred embodiment of this invention includes a booster of conventional configuration with the following improvements: two jet engines side-mounted in pylons extending from opposite sides of the inter-tank spacer, the spacer between the booster fuel and oxidizer tanks; fuel tanks for the jet engine integral to the inter-tank spacer; an empennage for directional stability, control, and supplement lift on the return flight; a reaction control system of conventional means for exo-atmospheric attitude control and attitude control during the landing sequence; avionics for atmospheric flight, automatic control, and position reference; and a landing pad mating interface on the aft-ring of the booster.

The jet engines run with afterburner from lift-off through the lower atmosphere augmenting thrust from the rocket engine. The jets are shut down at their atmospheric ceiling while the rocket continues to burn until main engine cut-off. After payload and 2nd stage separation, the booster continues on an exo-atmospheric ballistic trajectory back to the Earth. During this phase, booster orientation and control is provided by the reaction control system. Residual rocket propellant is vented from the tanks during this time. At a sufficient altitude, the jet engines are restarted with the booster long-axis oriented to a positive angle of attack for the descending turn and cross-range flight back to the launch site. The jets provide forward thrust while airflow over the inclined booster body provides lift. At a given distance from the landing site the booster executes a flair maneuver to transition from horizontal flight to vertical hover. The reaction control system assists to bring the booster nose up and over vertical with respect to the horizon. With the afterburners "on", thrust from the jet engines is sufficient to suspend the empty weight of the booster in mid-air. Adjustments to the jet exhaust by thrust vector control, turbine bleed-air, and/or the reaction control system provide the necessary forces to guide the hovering booster over the landing pad. A controlled reduction of jet thrust lowers the booster to the pad. The booster lands on a landing pad designed to support the lower mounting ring of the booster. Onboard controllers command the booster during flight using internal and external cues for position reference.

Alternate embodiments include high-speed wings for supplemental lift; air-breathing ramjet, scramjet, or rocket-based combined-cycle engines instead of jet engines; a symmetric array of air-breathing engines mounted peripherally around the body of a booster; retractable landing legs for landings without the aid of a landing pad; and a manual override system for a ground-based pilot to land the booster manually if the automatic control system fails.

What is claimed is:

1. A reusable launch vehicle comprising:
   a first stage comprising a first engine and a second engine, said first engine comprising a rocket engine, said second engine comprising an air breathing engine, the first stage comprising fuel and control systems for the first and second engines, the first stage adapted to lift off with thrust from both the first and second engines; and
   a second stage comprising a third engine, said third engine comprising a rocket engine, the second stage releasably coupled to the first stage and adapted to carry a payload, the second stage adapted to release from the first stage at a selected time, the second engine adapted to propel the first stage in atmospheric flight to a selected landing site, the second engine adapted to support the first stage in a hover so that the first stage lands in a substantially vertical condition whereby the first stage is recovered for re-use in a manner that does not substantially reduce ascent performance with drag and weight penalties from wings and landing gear.

2. The launch vehicle of claim 1, wherein said second engine comprises a turbojet engine.

3. The launch vehicle of claim 1, wherein said second engine comprises a plurality of airbreathing engines attached symmetrically to the first stage whereby two or more smaller engines generate a balanced thrust.

* * * * *